United States Patent [19]
Christner

[11] 4,352,303
[45] Oct. 5, 1982

[54] GAS CONTROL GRIP FOR THE STEERING DEVICE OF A MOTOR-DRIVEN DOUBLE-WHEELED VEHICLE

[75] Inventor: Heinz Christner, Hülben, Fed. Rep. of Germany

[73] Assignee: Gustav Magenwirth GmbH & Co., Urach, Fed. Rep. of Germany

[21] Appl. No.: 172,985

[22] Filed: Jul. 28, 1980

[30] Foreign Application Priority Data

Mar. 28, 1980 [DE] Fed. Rep. of Germany ....... 3012034

[51] Int. Cl.³ .......................... B62K 23/06; G05G 7/02
[52] U.S. Cl. ........................................ 74/489; 74/505; 180/219; 180/335
[58] Field of Search .................. 180/219, 332, 335; 280/289 H, 289 R; 74/488, 489, 505, 507, 551.8, 551.9

[56] References Cited

U.S. PATENT DOCUMENTS

| | | | |
|---|---|---|---|
| 2,796,773 | 6/1957 | Wooler et al. | 74/489 |
| 3,633,437 | 1/1972 | Ishida | 74/489 |

FOREIGN PATENT DOCUMENTS

| | | | |
|---|---|---|---|
| 530062 | 12/1940 | United Kingdom | 74/489 |
| 750478 | 6/1956 | United Kingdom | 74/489 |

*Primary Examiner*—Joseph F. Peters, Jr.
*Assistant Examiner*—Donn McGiehan
*Attorney, Agent, or Firm*—Shenier & O'Connor

[57] ABSTRACT

A gas control grip for the handlebars of a motorcycle having a rotatable tubular handle made of plastic and a sectional housing clamped to the handlebars and surrounding one end of the tubular handle. An annular flange on the housing provided with a semi-circular clip fits into an annular groove in the handle to prohibit axial movement and to permit rotation of the handle.

4 Claims, 5 Drawing Figures

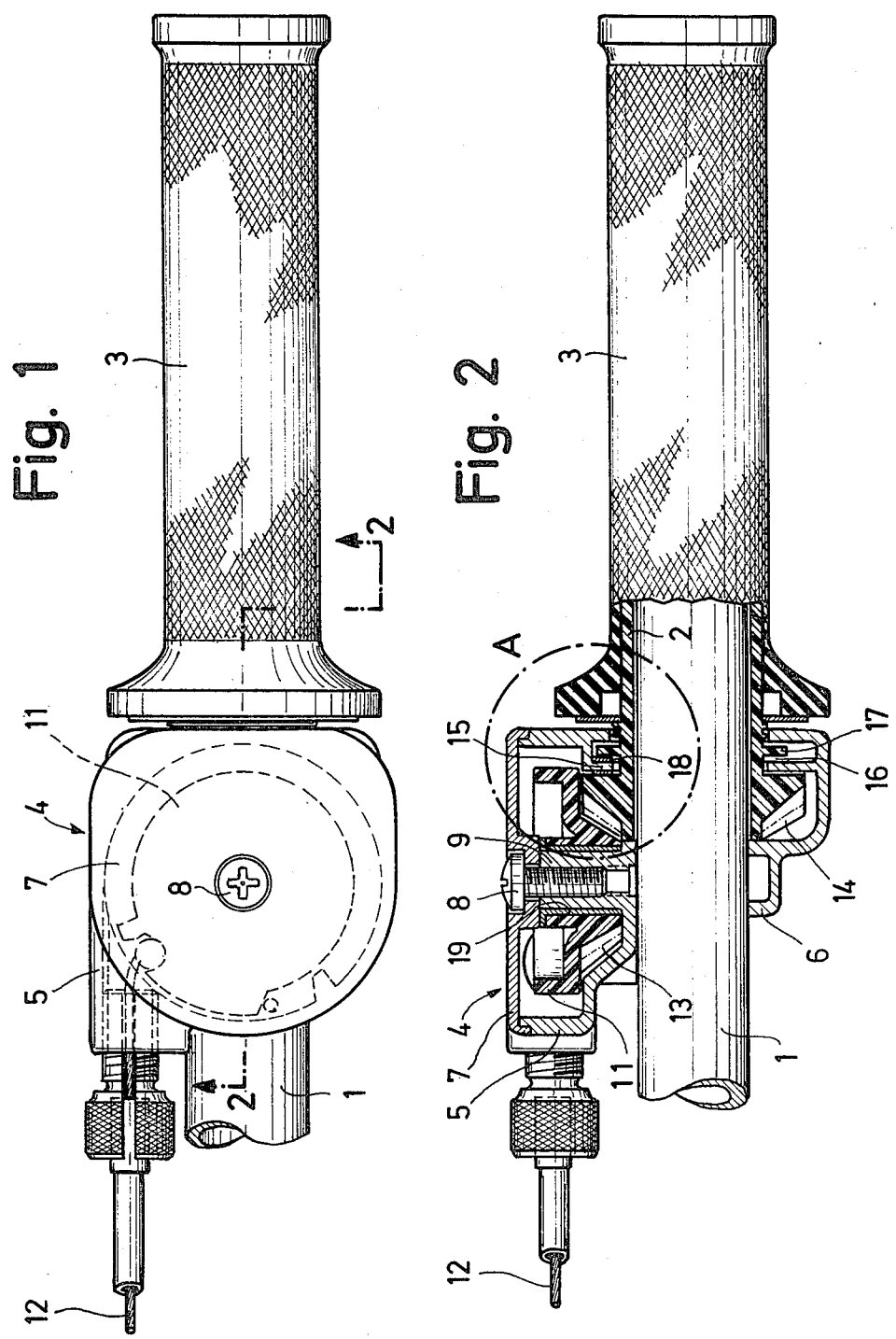

GAS CONTROL GRIP FOR THE STEERING DEVICE OF A MOTOR-DRIVEN DOUBLE-WHEELED VEHICLE

BACKGROUND OF THE INVENTION

The invention involves a gas control grip for the steering device of a motor-driven double-wheeled vehicle with a rotatable tubular handle made of plastic and mounted on the steering device, and with a multisectional housing fixed to the steering device around one end of the tubular handle, such that an arm of the housing fits into an annular groove of the tubular handle and the tubular handle is secured against axial shifting.

In known gas control grips of this type, the arm of the housing with its side surfaces directly abuts the side walls of the groove formed on the tubular handle and rubs against them. As a rule, the housing is made of a metal—a magnesium alloy, for example. Experience has shown that there is substantial friction between the arm and the inner walls of the groove that leads to rapid wear of the parts and renders them useless in a relatively short time to the point where they must be replaced.

SUMMARY OF THE INVENTION

The problem is solved by the invention, in which the arm is provided with a wear-resistant sheath made of a material other than that of the arm itself to cure the fault.

BRIEF DESCRIPTION OF THE DRAWINGS

The following description of a preferred prototype of the invention together with the accompanying diagram serves as a further explanation. Shown are:

FIG. 1. Top view of a gas control grip;
FIG. 2. Profile view of a section of the gas control grip of FIG. 1 cut along the line 2—2.

DESCRIPTION OF THE PREFERRED EMBODIMENT

Figure 3:
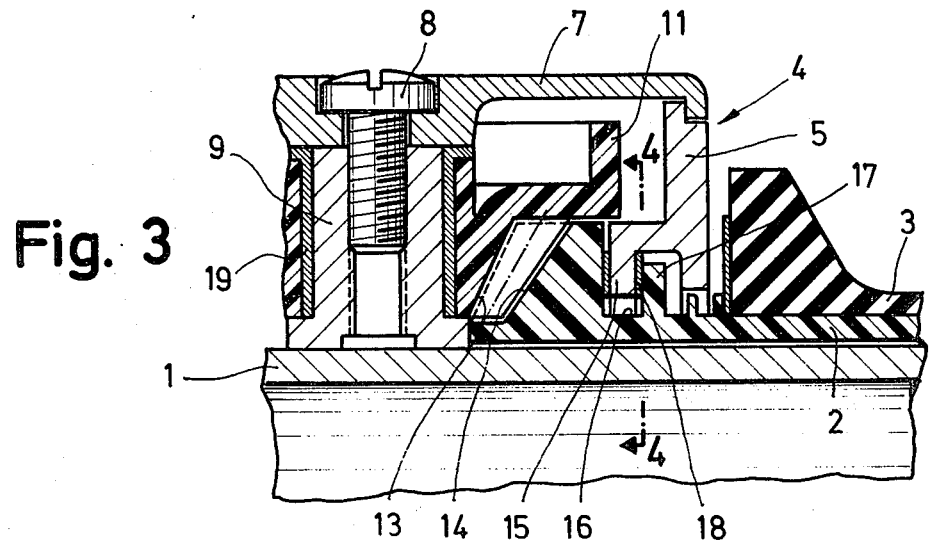
FIG. 3. A close-up view of the neighborhood of the dotted circle A in FIG. 2.

FIGS. 1 and 2 show the right-hand part, tubular in the usual fashion, of a steering device 1 for a motor-driven double-wheeled vehicle. The steering device 1 consists of an ordinary, surface-cleaned steel tube, nickel-plated, for example. A rotatable tubular handle 2, made of plastic, is set on the steering device 1 (compare also FIGS. 3 and 4). The tubular handle 2 is held by the grip 3, made of a rubber-like material, which is grasped by the right hand of the vehicle driver. The tubular handle 2 turns with rotation of the grip 3.

The end of the tube handle 2 projecting from the grip 3 (to the left of FIGS. 1 and 2) is covered and surrounded by a two-sectioned housing 4, for example, fixed to the steering device. Both parts 5 and 6 of the housing 4 are secured to the steering device 1 by screws in a conventional and therefore not separately described fashion. The upper part 5 of the housing is closed by a cover 7, held to part 5 by the screw 8. A rotatable cable drum 11, on which a Bowden control cable 12 can be wound in the usual manner, is set on a circular axle journal 9 above the upper housing part 5. The underside of cable drum 11 is formed with a unitary bevel gear 13.

The bevel gear 13 meshes with bevel gear 14 formed as a unitary part at the free end of the tubular handle 2. When the tubular handle 2 is correspondingly rotated by means of the grip 3, the cable drum 11 is forced to turn and the Bowden control cable is wound up to a greater or lesser extent such that, in this fashion, the fuel feed to the motor can be controlled in the usual way.

Figure 4:
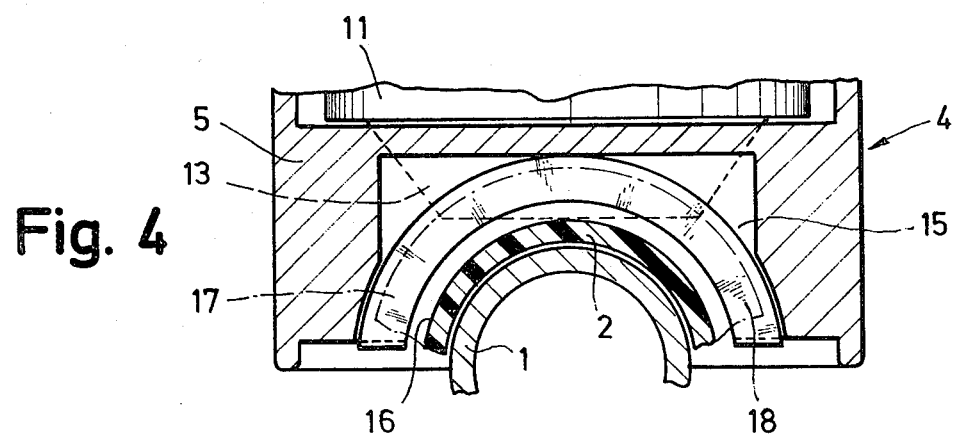
FIG. 4. A view of the section along the line 4—4 in FIG. 3.

To keep the bevel gear 14 continually meshed with the bevel gear 13 and thus secure the tubular handle against axial shifting on the steering device 1, the housing 4 fixed to the steering device 1—compare FIGS. 3 and 4 in particular—has an annular flange 15 which meshes with the circular groove 16 at the free end of the tubular handle 2. The side walls of the circular groove 16 are formed by the back wall of the bevel gear 14 on one side, and on the other by a unitary collar 17 on the tubular handle 2. To prevent friction wear between the arm 15 and the side walls of the groove 16 in the invention embodiment described, a clip or clamp type sheath 18 (FIG. 5) is fixed on the section of the annular flange 15 on the upper part 5 of the housing 4, against which the inner walls of the groove 16 rub when the tubular handle 2 is turned. The sheath 18 is made of a material that is more resistant to wear than the material—e.g., magnesium alloy—from which the flange 15 is made. The sheath 18 may, for example, consist of tempered or hardened steel. Special types of synthetic material may also be suitable in certain cases. In any event, depending on the materials of which the arm 15 and the inner walls of the groove 16 are made, one can select a material for the sheath 18 that is wear-resistant and has practically no erosive effect on the inner walls of the groove 16. In this way, the life of the system described is considerably extended.

Figure 5:
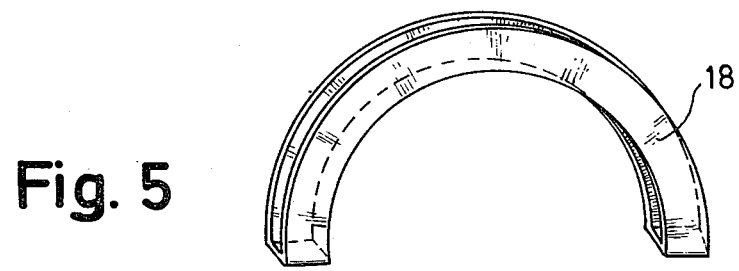
FIG. 5. A perspective of the stay-bolt sheath.

As shown in FIG. 5, sheath 18 is in the form of a clamp that can be placed loosely over the upper part of the annular flange 15. Thus, sheath 18 covers only part of the flange 15. If desired, a corresponding sheath may also be placed—compare with FIG. 2—on the part of flange 15 in the lower part 6 of housing 4. This, however, is not required as a rule.

In the design above, cable drum 11 is mounted on the upper part 5 of the housing (FIG. 3) so that it can rotate around the axle journal 9. Here also, to prevent wear on the axle journal 9 made of magnesium alloy, for example, by the constant rotation of a cable drum 11 made of a plastic, an improved version of the invention has a shell 19 on the axle journal 9 formed of a suitable material such as steel. This too almost completely precludes wear and extends the life of the system.

Having thus described my invention, what I claim is:

1. A gas control grip for the steering device of a motor cycle or the like in which a rotatable tubular handle formed of plastic is rotatably mounted on the steering device and in which a sectional housing is secured to the steering device around one end of the tubular handle in such a way that an annular flange on the housing fits into an annular groove in the handle to secure the handle against axial shifting characterized in the provision of a semicircular clip removably attached to the flange, said clip being so constructed and arranged as partially to cover the lateral faces of the flange extending into the groove.

2. A gas control grip as in claim 1 characterized in that the clip is made of steel.

3. A gas control grip as in claim 1 characterized in that the clip covers only a part of the flange located in the upper section of the housing.

4. A gas control grip as in claim 1 or 2 in which said housing is formed with an axle, said grip including a bevel gear rotatably received by said axle, characterized in the provision of a shell of wear resistant material between said axle and said gear.

* * * * *